United States Patent
Cho et al.

(10) Patent No.: US 8,909,237 B2
(45) Date of Patent: Dec. 9, 2014

(54) APPARATUS AND METHOD FOR ESTIMATING CARRIER TO INTERFERENCE AND NOISE RATIO IN A MOBILE COMMUNICATION SYSTEM BASED ON FRACTIONAL FREQUENCY REUSE

(75) Inventors: Jae-Hee Cho, Seoul (KR); Kwan-Hee Roh, Hwaseong-si (KR); Yong-Seok Kim, Hwaseong-si (KR); Soon-Young Yoon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1407 days.

(21) Appl. No.: 12/283,243

(22) Filed: Sep. 10, 2008

(65) Prior Publication Data

US 2009/0069026 A1    Mar. 12, 2009

(30) Foreign Application Priority Data

Sep. 10, 2007  (KR) .................. 10-2007-0091668

(51) Int. Cl.
*H04W 40/00*     (2009.01)
*H04W 72/08*     (2009.01)

(52) U.S. Cl.
CPC .................. *H04W 72/085* (2013.01)
USPC .......... 455/447; 455/446; 455/436; 455/522; 370/318

(58) Field of Classification Search
USPC ....................................... 455/447
See application file for complete search history.

(56) References Cited

U.S. PATENT DOCUMENTS

| | | | |
|---|---|---|---|
| 2008/0008113 A1* | 1/2008 | Cho et al. ...................... | 370/318 |
| 2008/0299983 A1* | 12/2008 | Kwak et al. .................... | 455/446 |
| 2008/0318576 A1* | 12/2008 | So et al. ......................... | 455/436 |
| 2009/0042595 A1* | 2/2009 | Yavuz et al. ................... | 455/522 |
| 2009/0303900 A1 | 12/2009 | Cho et al. | |

FOREIGN PATENT DOCUMENTS

| | | |
|---|---|---|
| KR | 10-0617835 | 8/2006 |
| KR | 10-2007-0072225 | 7/2007 |

OTHER PUBLICATIONS

Notice of Patent Grant dated May 19, 2014 in connection with Korean Patent Application No. 10-2007-0091668, 7 pages.

* cited by examiner

*Primary Examiner* — Gerald Johnson

(57) ABSTRACT

An apparatus and method for estimating a carrier to interference and noise ratio (CINR) in a mobile communication system based on a fractional frequency reuse are provided. The method includes receiving a report on CINR information on a common zone from a mobile station (MS) allocated a restricted zone, calculating a received signal power value using a CINR value and an interference level value for the common zone of the MS, and estimating a CINR value for a restricted zone using the received signal power value of the MS and an interference level for the restricted zone.

20 Claims, 4 Drawing Sheets

K=3  K=7
(CONVENTIONAL ART)

APPARATUS AND METHOD FOR ESTIMATING CARRIER TO INTERFERENCE AND NOISE RATIO IN A MOBILE COMMUNICATION SYSTEM BASED ON FRACTIONAL FREQUENCY REUSE

CROSS-REFERENCE TO RELATED APPLICATION(S) AND CLAIM OF PRIORITY

The present application claims priority under 35 U.S.C. §119(a) to a Korean Patent Application filed in the Korean Intellectual Property Office on Sep. 10, 2007 and assigned Serial No. 2007-91668, the contents of which are herein incorporated by reference.

TECHNICAL FIELD OF THE INVENTION

The present invention relates generally to an apparatus and method for estimating a carrier to interference and noise ratio (CINR) in a mobile communication system, and in particular, to an apparatus and method for estimating a CINR of a mobile station (MS) of a restricted zone in a mobile communication system based on a fractional frequency reuse.

BACKGROUND OF THE INVENTION

In a multi-carrier Orthogonal Frequency Division Multiplexing (OFDM) system, resource allocation is implemented in a subchannel unit consisting of a plurality of subcarriers. That is, a plurality of users divide and share the whole subcarrier, thereby being capable of obtaining a multi-user diversity gain in a frequency domain. In a broadband wireless communication system, all cells reuse the same frequency, and apply an adaptive modulation and coding (AMC) scheme according to the received signal strength and interference between adjacent cells, thereby maximizing a throughput.

FIGS. 1A and 1B illustrate examples of cell frequency arrangement and frequency reuse. As shown in FIGS. 1A and 1B, the same frequency is reused at a distance and this is called "frequency reuse". A frequency reuse factor 'K' of importance to a mobile communication system is a rate representing that the same frequency is reused every how many cells. As the frequency reuse factor 'K' increases, a distance between cells using the same frequency increases, thus decreasing the influence of interference caused by the use of the same frequency.

In FIG. 1A where a frequency reuse factor 'K' is equal to three (3), three (3) frequencies are reused at a specific distance. In FIG. 1B where a frequency reuse factor 'K' is equal to seven (7), seven (7) frequencies are reused at a specific distance.

A system having a frequency reuse factor of one (1) suffers serious inter-cell interference at a cell or sector boundary, thus causing inevitable throughput reduction and also encountering service outage circumstances. A fractional frequency reuse (FFR) technique is a method for improving performance at a cell or sector boundary when a frequency reuse factor is equal to one (1). The FFR technique reduces co-channel interference between adjacent cells by orthogonally dividing the whole subcarrier into a plurality of subbands, properly arranging the subbands, and avoiding the use of a part of the subbands in each cell. In other words, the FFR technique has been introduced to solve a problem that a low carrier to interference and noise ratio (CINR) leads to a reduction of performance of a mobile station (MS) located in a boundary area of each cell because all cells use the same frequency resource.

The FFR technique uses the fact that mobile stations (MSs) located in a cell center area and a cell boundary area are differently influenced by interference from an adjacent cell. That is, when an MS is located close to a serving base station (BS) in a cell center area, the MS is slightly influenced by path loss and is relatively slightly reduced in signal component reception sensitivity. However, the MS is located relatively far away from a neighboring interfering BS, thus being greatly influenced by path loss. As a result, the influence of co-channel interference (CCI) decreases. On the other hand, when an MS is located in a cell boundary area and is at a similar distance from both a serving BS and an interfering BS, the MS receives both a signal component and an interference component at a similar reception sensitivity. As a result, the influence of CCI increases. Accordingly, the FFR technique allows an MS located in a cell center area to use a resource whose frequency reuse factor is equal to one (1) and allows an MS located in a cell boundary area to use a resource whose frequency reuse factor is more than one (1), thus ensuring a reception performance to an MS located in a boundary to a certain extent.

In the FFR technique, a "common zone" is called a zone of a frequency reuse factor of one (1) used by an MS located in a cell center area and a "protected zone" is called a zone of a frequency reuse factor of more than one (1) used by an MS located in a cell boundary area.

The protected zone serves as a restricted zone for MSs located in other cell boundary areas. That is, the restricted zone is basically an empty zone unused by each BS to suppress co-channel interference. Each serving BS uses only the minimum transmit power to limit its interference influence on a neighboring BS only up to an allowable level, thus being capable of allocating a restricted zone to an MS located close to the serving BS for use.

As described above, a BS may determine the maximum transmit power for the restricted zone in addition to the common zone, determine a modulation and coding scheme (MCS) level, and perform resource allocation. This causes a problem of generating an overhead because a channel quality indicator (CQI) feedback may be implemented to determine the maximum transmit power for the restricted zone and a CQI feedback may be implemented to determine the maximum transmit power for the common zone.

SUMMARY OF THE INVENTION

To address the above-discussed deficiencies of the prior art, it is a primary aspect of the present invention to substantially solve at least the above problems and/or disadvantages and to provide at least the advantages below. Accordingly, one aspect of the present invention is to provide an apparatus and method for estimating a carrier to interference and noise ratio (CINR) for a restricted zone in a mobile communication system based on a fractional frequency reuse.

Another aspect of the present invention is to provide an apparatus and method for reducing an overhead of a channel quality indicator (CQI) feedback for a restricted zone in a mobile communication system based on a fractional frequency reuse.

The above aspects are achieved by providing an apparatus and method for estimating a CINR in a mobile communication system based on a fractional frequency reuse According to one aspect of the present invention, a method for estimating a carrier to interference and noise ratio (CINR) in a mobile communication system based on a fractional frequency reuse is provided. The method includes receiving a report on CINR information on a common zone from a mobile station (MS) allocated a restricted zone, calculating a received signal power value using a CINR value and interference level value for the common zone of the MS, and estimating a CINR value for a restricted zone using the received signal power value of the MS and an interference level for the restricted zone.

According to another aspect of the present invention, a base station (BS) apparatus for estimating a carrier to interference and noise ratio (CINR) in a mobile communication system based on a fractional frequency reuse is provided. The apparatus includes a received signal power calculator and a CINR calculator. The received signal power calculator receives CINR information on a common zone from a mobile station (MS) allocated a restricted zone, and calculates a received signal power value using a CINR value and interference level value for the common zone of the MS. The CINR calculator estimates a CINR value for the restricted zone using the received signal power value of the MS and an interference level for the restricted zone.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1A:
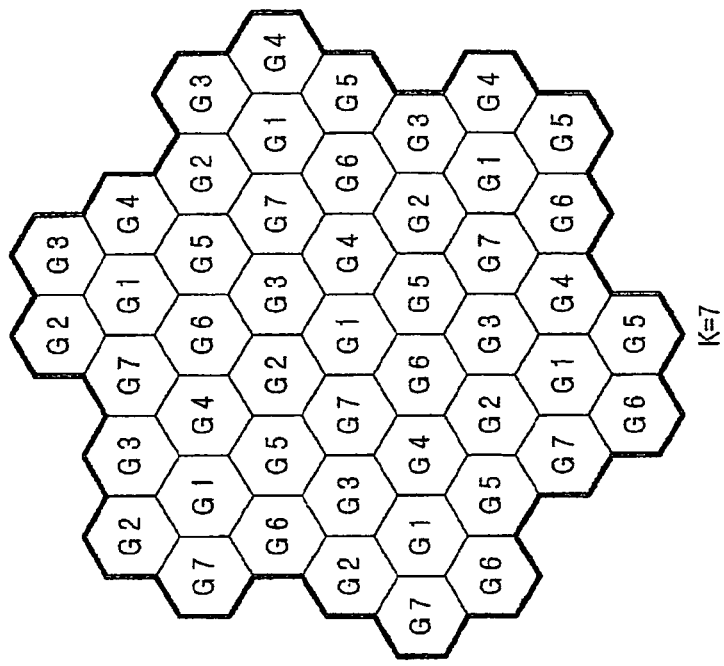
FIGS. 1A and 1B are diagrams illustrating examples of cell frequency arrangement and frequency reuse according to the conventional art.
Figure 1B:
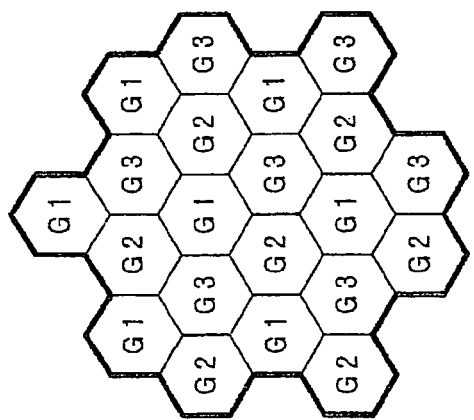
Figure 2:
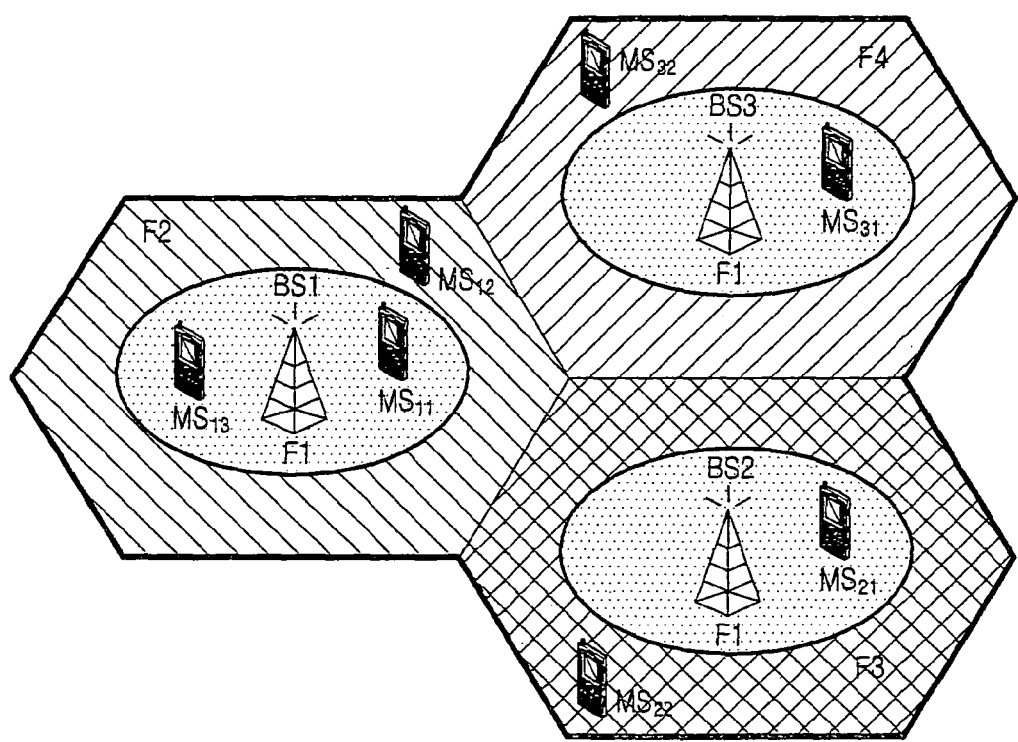
FIG. 2 is a diagram illustrating an example of a mobile communication system based on a fractional frequency reuse according to an exemplary embodiment of the present invention.
Figure 3:
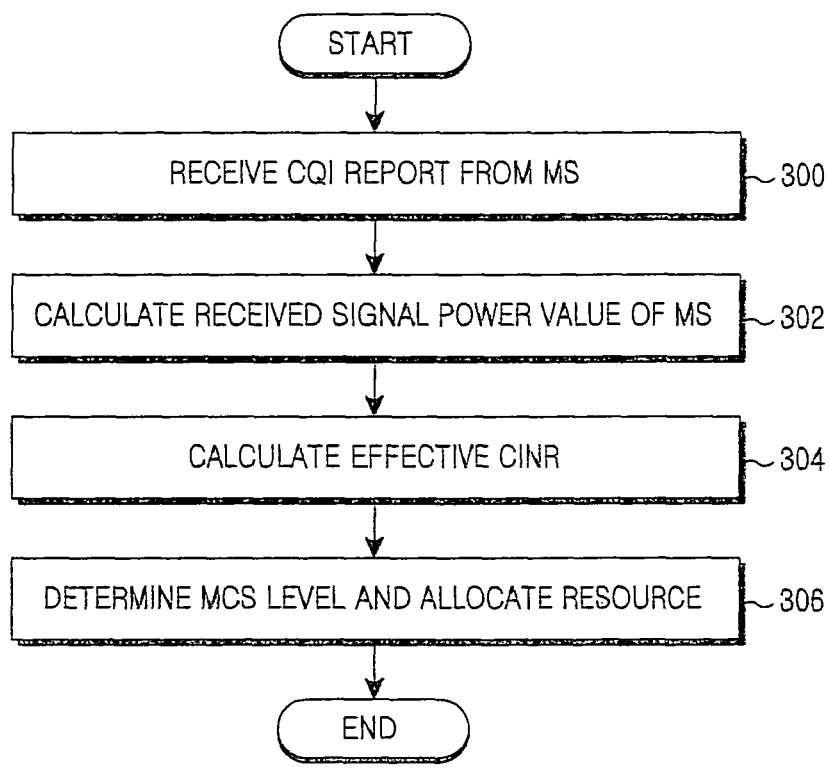
FIG. 3 is a flow diagram illustrating a base station (BS) operation for estimating a carrier to interference and noise ratio (CINR) for a restricted zone of a mobile station (MS) in a mobile communication system based on a fractional frequency reuse according to an exemplary embodiment of the present invention.
Figure 4:
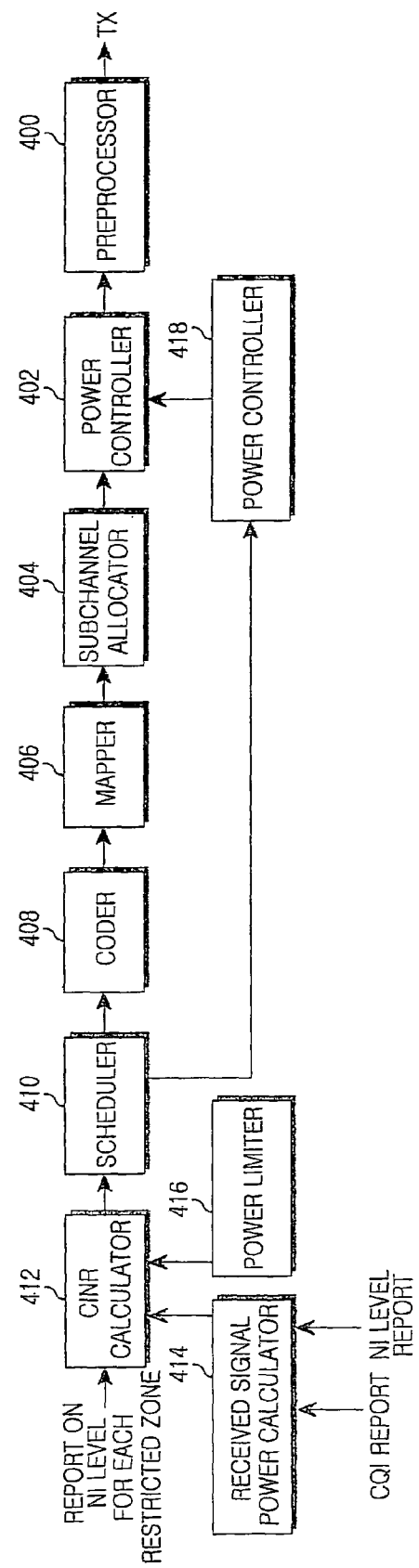
FIG. 4 is a block diagram illustrating a base station (BS) apparatus for a transmit power in a mobile communication system based on a fractional frequency reuse according to an exemplary embodiment of the present invention.

FIGS. 2 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

A description of an apparatus and method for estimating a carrier to interference and noise ratio (CINR) for a restricted zone in a mobile communication system based on a fractional frequency reuse according to an exemplary embodiment of the present invention is made below.

FIG. 2 is a diagram illustrating an example of a mobile communication system based on a fractional frequency reuse according to an exemplary embodiment of the present invention. The assumption is that each base station (BS) uses a frequency reuse factor of one (1) in a cell center area and uses a frequency reuse factor of three (3) in a cell boundary area. Table 1 below shows a classification of a zone based on a frequency reuse factor by BS.

TABLE 1

|  | Common zone | Protected zone | Restricted zone |
| --- | --- | --- | --- |
| BS1 | F1 | F2 | F3, F4 |
| BS2 | F1 | F3 | F2, F4 |
| BS3 | F1 | F4 | F2, F3 |

That is, a BS1 uses 'F1' as a common zone, and uses 'F2' as a protected zone in a cell boundary area. In neighboring BSs BS2 and BS3, the protected zone 'F2' of the BS1 becomes a restricted zone restricted to reduce co-channel interference. In the BS1, restricted zones are protected zones 'F3' and 'F4' of the neighboring BSs BS2 and BS3. Likely, in the BS2, 'F1' is set as a common zone, the 'F3' is set as a protected zone, and the 'F2' and 'F4' are set as restricted zones. In the BS3, 'F1' is set as a common zone, the 'F4' is set as a protected zone, and the 'F2' and 'F3' are set as restricted zones.

In FIG. 2, the restricted zone is basically an empty zone unused by each BS to suppress co-channel interference. Each BS uses only the minimum transmit power to limit the influence of its interference on a neighboring BS only up to an allowable level, thus being capable of allocating a restricted zone to a mobile station (MS) located close to the BS for use. That is, a restricted zone of each BS is used as a protected zone of a neighboring different BS. Therefore, to use the restricted zone primarily requires a transmit power control for minimizing the influence of co-channel interference on an MS that uses a protected zone of a neighboring different BS.

For example, an $MS_{22}$ uses the 'F3' that is the protected zone of the BS2 and an $MS_{32}$ uses the 'F4' that is the protected zone of the BS3. Here, an $MS_{13}$ is assumed to be located enough close to its own serving BS1, thus being capable of being allocated a resource through the restricted zones 'F3' and 'F4' of the BS1. For the BS1 to allocate the restricted zone 'F3' or 'F4' to the $MS_{13}$, the BS1 requires to maintain, below a proper level, the influence of downlink interference due to the use of the restricted zone 'F3' or 'F4' on the $MS_{22}$ and $MS_{32}$ each belonging to the neighboring BSs BS2 and BS3 signal. For the purpose of this, it is required to control a transmit power of the restricted zone. The transmit power control for the restricted zone is out of the scope of the present invention.

Because a transmit power of a restricted zone is low compared to other zones, when a restricted zone is allocated to a specific MS, it is required to estimate a CINR for the restricted zone of the MS so as to determine an MCS level. In an exemplary embodiment of the present invention, if a BS1 allocates a restricted zone to an $MS_{13}$, the $MS_{13}$ reports noise and interference (NI) levels of a common zone and the restricted zone and a CINR value of the common zone to the BS1. Then, the BS1 calculates a receive power of the $MS_{13}$ using the NI levels and CINR reported from the $MS_{13}$ and calculates an effective CINR (i.e., a CINR for the restricted zone). An operation method thereof is described below in detail with reference to FIG. 3.

FIG. 3 is a flow diagram illustrating a BS operation for estimating a CINR for a restricted zone of an MS in a mobile communication system based on a fractional frequency reuse according to an exemplary embodiment of the present invention.

Referring to FIG. 3, in step 300, a BS receives reports on a CINR (i.e., a CQI) for a common zone or protected zone basically or CINRs (i.e., CQIs) for all both the common and protected zones according to need from corresponding MSs, however, does not receive a report on a CINR value for a restricted zone. For example, in FIG. 2, an $MS_{11}$, an $MS_{12}$, and an $MS_{13}$ make a report on a CINR for a common zone or protected zone according to a predefined procedure. In some cases, the $MS_{13}$ can be allocated a restricted zone for use depending on a transmit power for a restricted zone. Further, upon request from a BS1, an $MS_{13}$ allocated a restricted zone separately reports on an interference signal level (i.e., an NI (noise & interference) level) for each restricted zone and an NI level for a CINR reported zone (e.g., a common zone), to the BS1.

Then, in step 302, the BS can obtain a received signal power value (S) of an MS through the CINR for the common zone or protected zone on which the MS allocated the restricted zone makes a report and the NI level value for the CINR reported zone (e.g., the common zone). That is, the MS allocated the restricted zone makes a report on the CINR value and NI level (N+ΣI) value for the common zone to the BS. Then, the BS can calculate a received signal power (S) of the MS through the CINR value and NI level (N+ΣI) value for the common zone as in Equation 1. Then, the MS measure and report an NI level for a restricted zone to the BS.

$$CINR = \frac{S}{N + \sum I}.$$ [Eqn. 1]

In Equation 1, the CINR is a CINR value for a common zone on which an MS allocated a restricted zone makes a report, the 'S' is a received signal power of the MS allocated the restricted zone, the 'N' is a noise for the common zone, and the 'I' is interference for the common zone.

Then, in step 304, the BS can calculate an effective CINR value for each restricted zone using the calculated received signal power (S), the NI level for the restricted zone measured and reported by the MS, and a transmit power value for the restricted zone. For example, assuming that 'β' denotes a ratio of transmit power of common zone or protected zone to transmit power of restricted zone and 'η' denotes the NI level of the restricted zone measured and reported by the MS, the BS can obtain an effective CINR value for the restricted zone as in Equation 2 below:

$$CINR_{restricted} = \beta S/\eta$$ [Eqn. 2]

In Equation 2, the $CINR_{restricted}$ is an effective CINR value (i.e., a CINR for a restricted zone), the 'β' is a ratio of transmit power of common zone or protected zone to transmit power of restricted zone, and the 'η' is an NI level for the restricted zone. That is, to estimate the CINR value for the restricted zone requires the received signal component (S), the NI level (η) for the restricted zone, and the transmit power (β) for the restricted zone. In general, a wireless mobile communication channel suffers a variation of magnitude and phase because of multi-path fading phenomenon. However, an interference signal is less in variation range compared to the 'S' that is a signal component because the interference signal is a sum of signals transmitted from a plurality of signal sources. That is, a time-dependent variation factor of an interference and thermal noise power corresponding to a denominator of Equation 1 is less than a variation factor of a signal component corresponding to a numerator. Thus, in estimating a CINR value for a restricted zone, CINR estimation performance is not greatly deteriorated although a report period for an NI level corresponding to the denominator is longer than a report period for a CINR for a common zone or protected zone necessary for estimating a signal component (S) corresponding to the numerator. That is, although basically receiving a report on a CINR value for a common zone or protected zone during a relative short period of time and receiving a report on an NI level value for a restricted zone during a period of time longer than the report period for the CINR value for the common zone or protected zone, the BS can relatively accurately and efficiently obtain a CINR value for the restricted zone.

Then, in step 306, the BS determines an MCS level with reference to the obtained effective CINR and performs resource allocation.

Thereafter, the BS terminates the CINR estimation process for the restricted zone.

FIG. 4 is a block diagram illustrating a base station (BS) apparatus for a transmit power in a mobile communication system based on a fractional frequency reuse according to an exemplary embodiment of the present invention.

Referring to FIG. 4, the base station (BS) apparatus includes a preprocessor 400, a power controller 402, a sub-channel allocator 404, a mapper 406, a coder 408, a scheduler 410, a CINR calculator 412, a received signal power calculator 414, a power limiter 416, and a power controller 418.

The received signal power calculator 414 receives a report on CINR (i.e., CQI) measurement value and NI level information for a common zone and protected zone from a corresponding MS, calculates a received signal power, and outputs the calculated received signal power to the CINR calculator 412.

The CINR calculator 412 estimates a downlink CINR of a common zone of each MS using downlink channel information measured and reported by an MS and a transmit power of the common zone determined by aBS. In addition, the CINR calculator 412 can calculate an effective CINR value for each restricted zone using a calculated received signal power (S), an NI level for a restricted zone measured and reported by an MS, and a transmit power value for the restricted zone (referring to FIG. 2).

The scheduler 410 determines a priority by MS using the estimated CINR value and selects an MS to be allocated a resource. The scheduler 410 determines a position and quantity of a resource to be allocated to the selected MS and determines a modulation order, a coding rate and the like. The coder 408 receives corresponding data from the scheduler 410 and codes the data using convolutional code (CC) or convolutional turbo code (CTC). The mapper 406 processes, by constellation mapping, a bit stream from the coder 408 and outputs the processed bit stream to the subchannel allocator 404. The subchannel allocator 404 maps a symbol to a subchannel designated by the scheduler 410. The power controller 402 controls a transmit power by subchannel or subcarrier. The preprocessor 400 performs functions of pilot insertion, Inverse Fast Fourier Transform (IFFT), digital to analog Conversion (ADC) and the like. The power limiter 416 determines the maximum transmit power by subchannel. The power controller 418 controls a transmit power by subchannel.

As described above, exemplary embodiments of the present invention have an advantage of reducing an overhead resulting from a report of a CINR for a restricted zone, by estimating a CINR for a restricted zone in a mobile communication system based on a fractional frequency reuse. That is, exemplary embodiments of the present invention have an advantage of, because an NI level that an MS may report is less in time-dependent variation range than a signal, being capable of reducing a feedback overhead component compared to a scheme that an MS directly measures and reports a CINR for a restricted zone every time.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method in a base station (BS) for estimating a carrier to interference and noise ratio (CINR) in a mobile communication system based on a fractional frequency reuse, the method comprising:
receiving a CINR information for a common zone, a first interference level for a restricted zone, and a second interference level for the common zone from a mobile station (MS);
calculating a received signal power value using the CINR information and the second interference level for the common zone of the mobile station; and
estimating a CINR value for a restricted zone using the received signal power value of the mobile station and the first interference level for the restricted zone,
wherein a report period of the CINR information for the common zone is different from a report period of the first interference level for the restricted zone and a report period of the second interference level for the common zone.

2. The method of claim 1, further comprising determining a modulation and coding scheme (MCS) level according to the estimated CINR value for the restricted zone, and allocating a resource.

3. The method of claim 1, wherein a report period of the second interference level is longer than a report period of the CINR information for the common zone.

4. The method of claim 1, wherein the received signal power is calculated by:

$$CINR = \frac{S}{N + \sum I},$$

where the CINR is a CINR value for a common zone on which the mobile station allocated a restricted zone makes a report, the 'S' is a received signal power of the mobile station allocated the restricted zone, the 'N' is a noise for the common zone, and the 'I' is an interference for the common zone.

5. The method of claim 1, wherein the CINR value for the restricted zone is calculated by:

$$CINR_{restricted} = \beta S/\eta,$$

wherein the $CINR_{restricted}$ is a CINR value for a restricted zone, the 'β' is a ratio of the transmit power of the common zone or the protected zone to the transmit power of restricted zone, and the 'η' is an interference level for the restricted zone.

6. The method of claim 1, further comprising receiving a report on an interference level information on the restricted zone and a report on an interference level information on the common zone.

7. The method of claim 1, wherein a transmit power of the restricted zone is lower than a transmit power of the common zone.

8. A base station (BS) apparatus for estimating a carrier to interference and noise ratio (CINR) in a mobile communication system based on a fractional frequency reuse, the apparatus comprising:
a received signal power calculator configured to receive a CINR information for a common zone, a first interference level for a restricted zone, and a second interference level for the common zone from a mobile station (MS), and calculate a received signal power value using the CINR information and the second interference level value for the common zone of the mobile station; and
a CINR calculator configured to estimate a CINR value for the restricted zone using the received signal power value of the mobile station and an interference level for the restricted zone,
wherein a report period of the CINR information for the common zone is different from a report period of the first interference level for the restricted zone and a report period of the second interference level for the common zone.

9. The apparatus of claim 8, further comprising a scheduler configured to determine a modulation and coding scheme (MCS) level according to the estimated CINR value for the restricted zone, and allocate a resource.

10. The apparatus of claim 8, wherein a report period of the second interference level is longer than a report period of the CINR information or the common zone.

11. The apparatus of claim 8, wherein the received signal power is calculated by:

$$CINR = \frac{S}{N + \sum I},$$

where the CINR is a CINR value for a common zone on which a mobile station allocated a restricted zone makes a report, the 'S' is a received signal power of the mobile station allocated the restricted zone, the 'N' is a noise for the common zone, and the 'I' is an interference for the common zone.

12. The apparatus of claim 8, wherein the CINR value for the restricted zone is calculated by:

$$CINR_{restricted} = \beta S/\eta,$$

where the $CINR_{restricted}$ is a CINR value for a restricted zone, the 'β' is a ratio of a transmit power of the common zone or the protected zone to the transmit power of restricted zone, and the 'η' is an interference level for the restricted zone.

13. The apparatus of claim 8, wherein the CINR calculator is further configured to receive a report on an interference level information on the restricted zone, and
   wherein the received signal power calculator is further configured to receive a report on an interference level information on the common zone.

14. The apparatus of claim 8, wherein a transmit power of the restricted zone is lower than a transmit power of the common zone.

15. In a mobile station (MS) using a fractional frequency reuse, a method comprising:
   estimating a carrier to interference and noise ratio (CINR) for a common zone in the mobile communication system; and
   reporting the CINR for the common zone, a first interference level for a restricted zone, and a second interference level for the common zone to a base station (BS),
   wherein a report period of the CINR for the common zone is different from a report period of the first interference level for the restricted zone and a report period of the second interference level for the common zone.

16. The method of claim 15, further comprising determining a modulation and coding scheme (MCS) level according to the estimated CINR value for the common zone, and allocating a resource.

17. The method of claim 15, wherein the CINR for the common zone and a second interference level for the common zone are used for calculating a received signal power of the mobile station in the base station.

18. The method of claim 17, wherein the received signal power of the mobile station and the first interference level for the restricted zone are used for calculating a CINR for the restricted zone.

19. The method of claim 15, wherein the report period of the second interference level is longer than the report period of the CINR for the common zone.

20. The method of claim 17, wherein a transmit power of the restricted zone is lower than a transmit power of the common zone.

* * * * *